US012620821B2

(12) United States Patent
Kinomura

(10) Patent No.: US 12,620,821 B2
(45) Date of Patent: May 5, 2026

(54) POWER SUPPLY EQUIPMENT

(71) Applicant: TOYOTA JIDOSHA KABUSHIKI KAISHA, Toyota (JP)

(72) Inventor: Shigeki Kinomura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 937 days.

(21) Appl. No.: 17/886,867

(22) Filed: Aug. 12, 2022

(65) Prior Publication Data

US 2023/0100938 A1     Mar. 30, 2023

(30) Foreign Application Priority Data

Sep. 24, 2021    (JP) ................................. 2021-155176

(51) Int. Cl.
| | |
|---|---|
| *H02J 7/00* | (2026.01) |
| *B60L 53/31* | (2019.01) |
| *B60L 53/35* | (2019.01) |
| *H02J 7/70* | (2026.01) |

(52) U.S. Cl.
CPC ................ *H02J 7/70* (2026.01); *B60L 53/31* (2019.02); *B60L 53/35* (2019.02)

(58) Field of Classification Search
CPC . B60L 53/31; B60L 53/35; H02G 9/00; H02J 7/0042
See application file for complete search history.

(56) References Cited

U.S. PATENT DOCUMENTS

2022/0144113 A1 *  5/2022  Freeling-Wilkinson ....................
                                                  B60L 53/31

FOREIGN PATENT DOCUMENTS

JP        2004278096 A  * 10/2004
JP          5475407 B2    4/2014

* cited by examiner

*Primary Examiner* — Julian D Huffman
*Assistant Examiner* — Sadia Kousar
(74) *Attorney, Agent, or Firm* — Sughrue Mion, PLLC

(57) ABSTRACT

A charging stand is power supply equipment being storable under a ground, and includes: an electrical component for supplying electric power to a vehicle on the ground (e.g., a control device, a power supply circuit, an actuator, a connector, a touch panel display, a communication device, a notification device, and a cable reel device); and a buoyancy generation portion causing a specific component that is at least a part of the electrical component and for which submersion is avoided (e.g., the control device, the power supply circuit, the actuator, the connector, the touch panel display, the communication device, the notification device, and the cable reel device) to float above the ground by buoyancy when water is accumulated in a recess. With the above, when water is accumulated in the recess, the specific component for which submersion is avoided among the electrical component can be floated above the ground by buoyancy.

9 Claims, 8 Drawing Sheets

POWER SUPPLY EQUIPMENT

CROSS-REFERENCE TO RELATED APPLICATION

This application claims priority to Japanese Patent Application No. 2021-155176 filed on Sep. 24, 2021, incorporated herein by reference in its entirety.

BACKGROUND

1. Technical Field

The present disclosure relates to power supply equipment, and more particularly to power supply equipment that can be stored in a storage portion under the ground.

2. Description of Related Art

Charging equipment for charging a power storage device mounted on a vehicle or the like is installed in, for example, a parking lot or a sidewalk. However, the charging equipment occupies the installation space, and therefore may interfere with walking or traveling of the vehicle. Therefore, for example, a technique for storing the charging equipment under the ground has been devised, such as a charging pole disclosed in Japanese Patent No. 5475407 (JP 5475407 B).

SUMMARY

The charging equipment as described above can be stored under the ground. Therefore, there is a risk of being submerged in the event of heavy rain such as sudden downpour.

The present disclosure has been made to solve the above-mentioned issue, and an object thereof is to provide power supply equipment that can suppress electrical components from being submerged.

Power supply equipment according to the present disclosure is power supply equipment that is storable under a ground, and includes: an electrical component for supplying electric power to a vehicle above the ground; and a buoyancy generation portion that floats a specific component that is at least a part of the electrical component and for which submersion is avoided above the ground when water is accumulated in the storage portion.

With the configuration above, when water is accumulated in the underground storage portion in which the power supply equipment is stored, the specific component for which submersion is avoided of the electrical component can be floated above the ground by buoyancy. As a result, it is possible to provide the power supply equipment capable of suppressing submersion of the electrical component.

The power supply equipment may further include a housing that includes the electrical component built in the housing. The electrical component may include a power supply port that supplies electric power to the vehicle on the ground. The housing may include a fixed portion fixed to a bottom surface of the storage portion, and a movable portion that includes the specific component built in the movable portion and that is displaceable between a position at which the power supply port is housed under the ground and a position at which the power supply port is exposed on the ground. The power supply equipment may further include an electric actuator that raises and lowers the movable portion.

With the configuration above, when the specific component is not submerged, the power supply port for supplying electric power to the vehicle on the ground can be exposed on the ground by raising the movable portion.

The buoyancy generation portion may float the movable portion above the ground. With the configuration above, it is possible to suppress the specific component built in the movable portion among the electrical components from being submerged.

The buoyancy generation portion may float the movable portion above the ground. With the configuration above, it is possible to suppress the electrical component that is built in the fixed portion and other than the specific component, in addition to the specific component built in the movable portion among the electrical components.

The buoyancy generation portion may include a hollow and sealed box. With the configuration above, the specific component can float above the ground by the buoyancy of the hollow and sealed box.

The buoyancy generation portion may include a block made of a substance having a lower specific gravity than a specific gravity of water. With the configuration above, the specific component can float above the ground by the buoyancy of the block made of a substance having a smaller specific gravity than that of water.

According to the present disclosure, it is possible to provide the power supply equipment capable of suppressing submersion of the electrical components.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram showing configurations of a vehicle and power supply equipment according to the present embodiment;

FIG. 2 is a diagram showing a state in which a movable portion is raised;

FIG. 5 is a diagram showing a state of the charging stand 300 when the recess is submerged.

FIG. 7 is a diagram showing a state in which a movable portion according to the second embodiment is raised; and FIG. 8 is a diagram showing a state of the charging stand when a recess according to the second embodiment is submerged.

DETAILED DESCRIPTION OF EMBODIMENTS

First Embodiment

Figure 3:
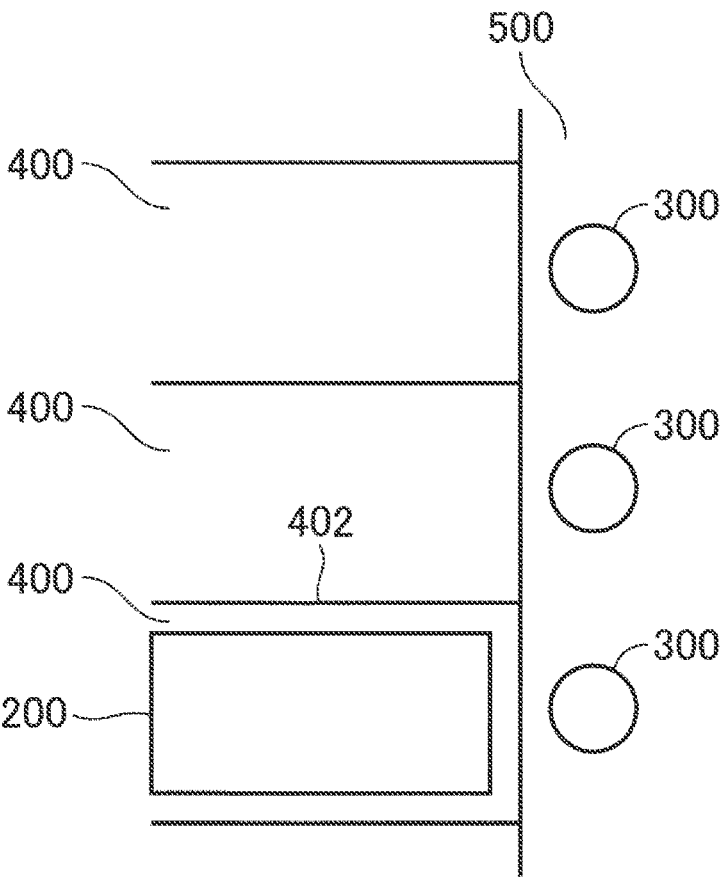
FIG. 3 is a diagram showing a first layout example of charging stands.

Hereinafter, an embodiment of the present disclosure will be described in detail with reference to the drawings. In the drawings, the same or corresponding parts are denoted by the same reference signs and the description thereof will not be repeated.

Figure 1:
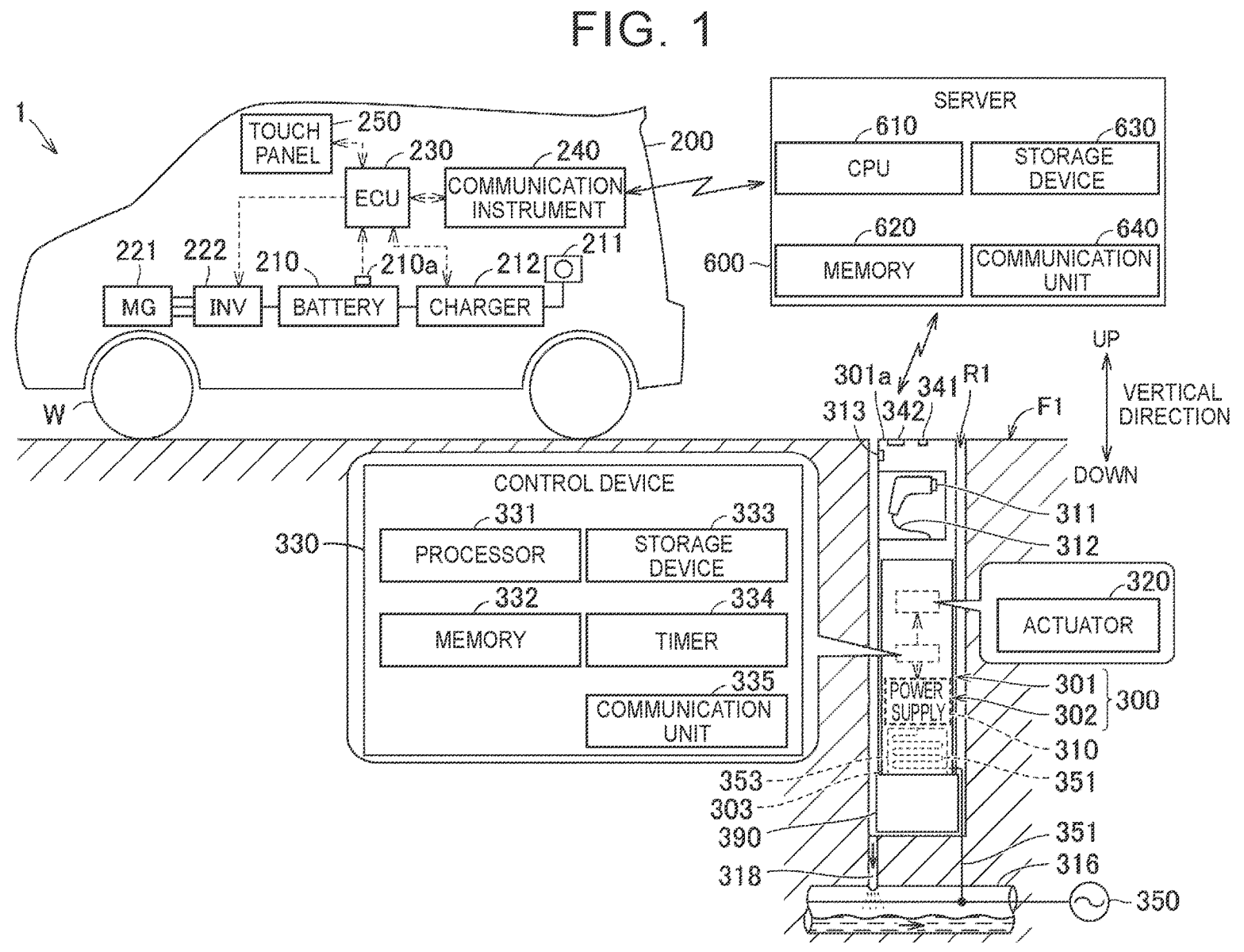

FIG. 1 is a diagram showing configurations of a vehicle and power supply equipment according to the present embodiment. Each of a plurality of sets of power supply equipment included in a power supply system 1 according to the present embodiment is a charging stand 300 shown in FIG. 1. The charging stand 300 corresponds to electric vehicle supply equipment (EVSE).

With reference to FIG. 1, the charging stand 300 is configured to be stored under a ground F1. The charging stand 300 corresponds to underground power supply equipment (power supply equipment that can be stored under the ground). The state of the charging stand 300 shown in FIG. 1 is a state in which the charging stand 300 is stored under the ground F1 (hereinafter, also referred to as a "stored state").

The charging stand 300 includes a movable portion 301, a fixed portion 302, and a buoyancy generation portion 390. Each of the movable portion 301, the fixed portion 302, and the buoyancy generation portion 390 includes a cylindrical housing. The housing of each of the movable portion 301, the fixed portion 302, and the buoyancy generation portion 390 is not limited to a cylindrical shape, and may have another shape or a square columnar shape. The material of each housing may be metal or plastic. The surface of each housing may be waterproofed. The housing of the movable portion 301 has a larger diameter than that of the housing of the fixed portion 302, and is disposed outside the housing of the fixed portion 302 such that the central axes of the housings coincide with each other. The movable portion 301 is provided so as to be displaceable in the vertical direction (up-down direction) along the outer peripheral surface of the fixed portion 302. The buoyancy generation portion 390 is disposed so as to be connected to the lower end of the fixed portion 302. The buoyancy generation portion 390 is a hollow and sealed housing. Therefore, when the buoyancy generation portion 390 is immersed in water, the buoyancy generation portion 390 generates buoyancy balanced with the gravity of the excluded water.

A sealing member 303 is provided at the lower end of the movable portion 301 such that foreign matter such as water and dust does not easily enter through the gap between the movable portion 301 and the fixed portion 302. The charging stand 300 is configured by the sealing member 303 and the housings of the movable portion 301 and the fixed portion 302 such that foreign matter does not easily enter the inside of the movable portion 301 and the fixed portion 302.

The charging stand 300 is installed in a recess R1 extending downward from the ground F1. In the stored state, the entire charging stand 300 is stored inside the recess R1. The buoyancy generation portion 390 is fixed to the bottom surface of the recess R1. The fixed portion 302 includes a power supply circuit 310, an actuator 320, a control device 330, and a cable reel device 353 in the housing. The movable portion 301 is driven by the actuator 320 and is displaced relative to the fixed portion 302. A sealing member (not shown) may be provided in the gap between the outer peripheral surface of the housing of the movable portion 301 and the inner wall of the recess R1.

The movable portion 301 has a space for storing a connector 311 and a power supply cable 312 (hereinafter referred to as "cable storage portion"). The cable storage portion is, for example, a recess provided in the side surface of the movable portion 301 by machining a part of the cylindrical housing of the movable portion 301. The connector 311 is provided to a first end of the power supply cable 312. A second end (the end opposite from the first end) of the power supply cable 312 is connected to the power supply circuit 310 via an electric wire (not shown). In the stored state, the movable portion 301 includes the connector 311 and the power supply cable 312 in the cable storage portion.

The power supply cable 312 (including the connector 311) may be configured to be detachable from the movable portion 301. In the movable portion 301 with the power supply cable 312 detached, a connector for the power supply cable 312 (for example, a portion to which the power supply cable 312 is attached) corresponds to the power supply port of the movable portion 301.

The power supply circuit 310 is configured to be supplied with electric power from an alternating current (AC) power source 350 via a power cable 351 and supply electric power to the movable portion 301 (more specifically, the power supply cable 312). The AC power source 350 supplies AC power to the power supply circuit 310. The AC power source 350 may be a commercial power source (for example, a power system provided by a power company). The power supply circuit 310 is controlled by the control device 330. The cable reel device 353 is a device for reeling the power cable 351 and includes an automatic reeling device (for example, a spring type cable reel) capable of automatically reeling the power cable 351 unreeled from the cable reel device 353.

The power supply cable 312 has flexibility. The cable storage portion may be provided with a cable reel configured such that the power supply cable 312 can be wound around the cable reel. The cable reel may be a mechanical self-reeling device (for example, a spring cable reel). Further, a lid (not shown) for opening and closing the cable storage portion may be provided. Further, a sensor for detecting whether the connector 311 and the power supply cable 312 are housed in the cable storage portion may be provided in the cable storage portion.

In the stored state, a top surface 301a of the movable portion 301 is flush with the ground F1. The actuator 320 is configured to directly or indirectly apply power to the movable portion 301 to move the movable portion 301 in the vertical direction (see FIG. 2 described later). The actuator 320 may be an electric actuator that generates power using electric power supplied from the power supply circuit 310. The displacement mechanism of the movable portion 301 may be a rack and pinion mechanism. For example, the displacement mechanism may be configured such that a rack gear is fixed to the movable portion 301, and the actuator 320 rotationally drives a pinion gear meshed with the rack gear. Alternatively, the displacement mechanism may be configured such that a rod connected to the piston is fixed to the movable portion 301, and the actuator 320 moves the piston using a hydraulic pressure or an air pressure. Alternatively, the actuator 320 may generate a magnetic force using electric power and directly apply power to the movable portion 301 using the magnetic force. The actuator 320 is controlled by the control device 330.

Figure 2:
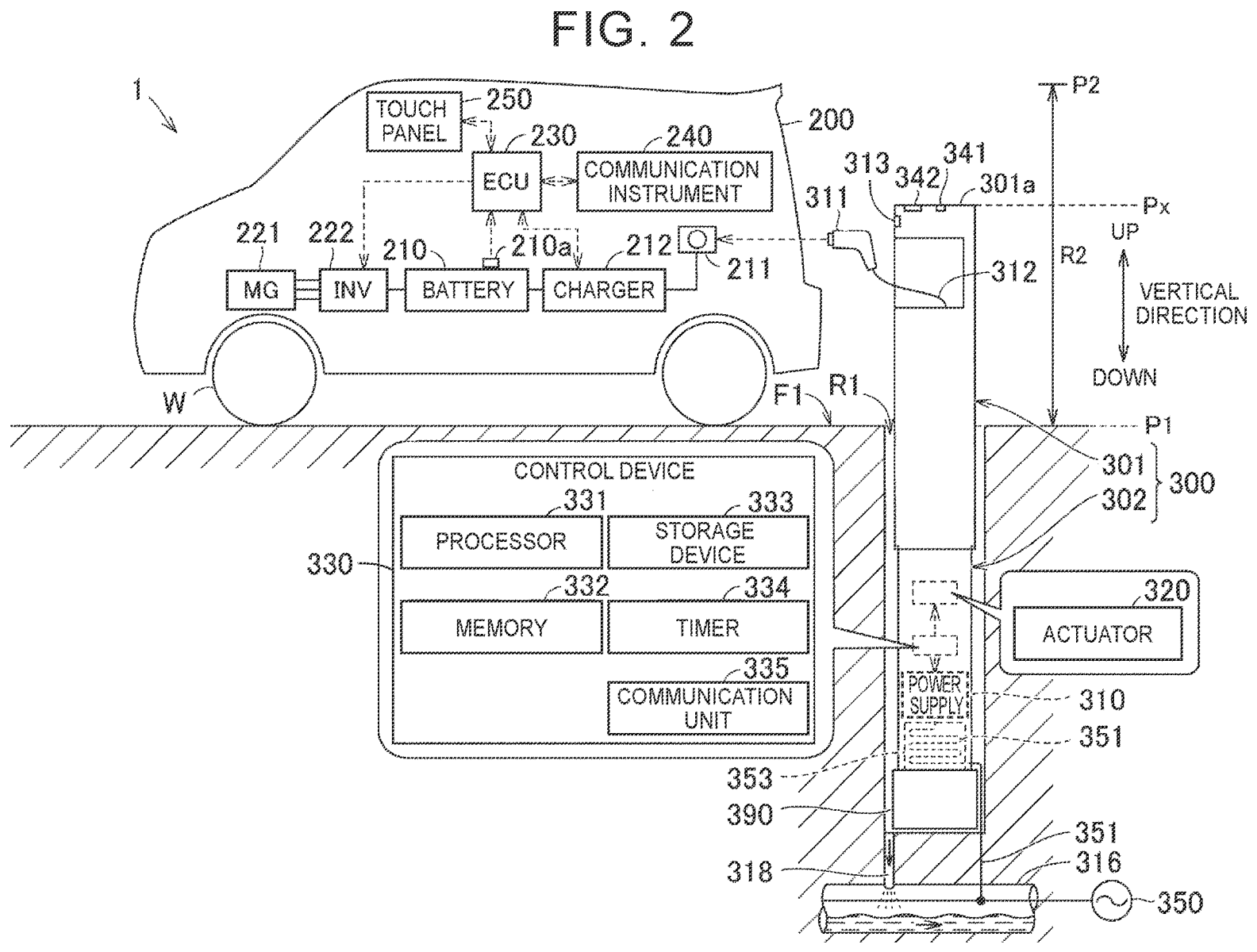

FIG. 2 is a diagram showing a state in which the movable portion 301 is raised. With reference to FIG. 2, the movable portion 301 is displaced (raised and lowered) in the vertical direction so as to change a position Px of the top surface 301a. Hereinafter, for convenience of description, the position Px of the top surface 301a of the movable portion 301 is regarded as the position of the movable portion 301.

The movable portion 301 is configured to be displaced within a movable range R2. A lower limit position P1 of the movable range R2 is the same height as the ground F1. When the position of the movable portion 301 is the lower limit position P1, the entire movable portion 301 (including the cable storage portion) is stored under the ground F1. When the position of the movable portion 301 is higher than the lower limit position P1, at least a part of the movable portion 301 is exposed above the ground F1. An upper limit position P2 of the movable range R2 is set to a position sufficiently higher than the height of the inlet of a general vehicle. When the position of the movable portion 301 is the upper limit position P2, the cable storage portion (the connector 311 and the power supply cable 312) of the movable portion 301 is exposed above the ground F1. Further, even when the position of the movable portion 301 is lower than the upper limit position P2 (for example, the position Px shown in FIG. 2), the cable storage portion can be exposed above the ground F1. As described above, the movable range R2 includes a first position (for example, the lower limit position P1) at which the power supply port is housed under the ground and a second position (for example, the upper limit position P2) at which the power supply port is exposed above the ground. In the present embodiment, the lower limit position P1 is the same position as the ground F1, but the lower limit position P1 may be set to a position below the ground F1.

With reference to FIG. 1, the movable portion 301 further includes a communication device 341, a notification device 342, and a touch panel display 313. The communication device 341 is configured to be capable of wirelessly communicating with a server 600 that will be described later. The communication device 341 may be configured to be able to communicate with a communication device other than the server 600. The communication device 341 transmits information received from the outside of the charging stand 300 to the control device 330. The control device 330 sequentially transmits the state of the charging stand 300 to the server 600 via the communication device 341.

The notification device 342 is provided near the top surface 301a of the movable portion 301. In the present embodiment, the notification device 342 includes a lamp and a speaker. The lamp may be a light emitting diode (LED) lamp. The control device 330 controls the lighting state of the lamp (for example, lighting, blinking, and extinguishing). The control device 330 controls the speaker so as to cause the speaker to perform notification by sound (including voice). The touch panel display 313 receives input from the user and displays various types of information. The touch panel display 313 is configured to receive instructions regarding power supply (for example, instructions for starting and stopping power supply). The touch panel display 313 is also configured to display the state of power supply (power supply being performed or power supply stopped) of the charging stand 300. The touch panel display 313 is controlled by the control device 330.

The control device 330 may be a computer. The control device 330 is configured to include a processor 331, a memory 332, a storage device 333, a timer 334, and a communication unit 335. As the processor 331, for example, a central processing unit (CPU) can be adopted. In addition to a program, the memory 332 stores information used in the program (for example, maps, mathematical formulas, and various parameters). In the present embodiment, as the processor 331 executes the program stored in the memory 332, various controls in the charging stand 300 are executed. However, the various controls in the charging stand 300 are not limited to execution by software, and execution by dedicated hardware (electronic circuit) is also possible. The number of processors included in the control device 330 can be set as appropriate, and a processor may be prepared for each predetermined control. The storage device 333 is configured to be able to store the stored information. The communication unit 335 is an interface with the communication device 341.

The timer 334 is configured to notify the processor 331 of the arrival of the set time. At the time set in the timer 334, the timer 334 transmits a signal for notifying the arrival of the set time to the processor 331. However, the timer 334 may be hardware (timer circuit), or may be realized by software. Further, the control device 330 can acquire the current time using a real-time clock (RTC) circuit (not shown) built in the control device 330.

The vehicle 200 shown in FIGS. 1 and 2 is an electrified vehicle including a battery 210, devices for traveling using electric power stored in the battery 210 (for example, a motor generator (hereinafter referred to as "MG") 221 and an inverter (hereinafter referred to as "INV") 222 described later), and devices for charging the battery 210 using the charging stand 300 (for example, an inlet 211 and a charger 212 described later). The vehicle 200 according to the present embodiment is a battery electric vehicle (BEV) without an engine (internal combustion engine).

The vehicle 200 further includes an electronic control unit (hereinafter referred to as "ECU") 230, a communication instrument 240, and a touch panel display 250. The ECU 230 may be a computer. The ECU 230 includes a processor, a memory, and a storage device (none of which are shown). Various vehicle controls are executed as the processor executes the program stored in the memory. However, the vehicle control is not limited to execution by software, and execution by dedicated hardware (electronic circuit) is also possible.

The touch panel display 250 receives a touch operation by the user and outputs the contents of the received touch operation to the ECU 230. The ECU 230 executes the process in accordance with the program corresponding to the content of the touch operation. The ECU 230 outputs a signal for displaying the execution result of the program to the touch panel display 250. The touch panel display 250 displays an image corresponding to a signal from the ECU 230.

The ECU 230 is configured to communicate with the outside of the vehicle 200 through the communication instrument 240. The communication instrument 240 includes various communication interfaces (I/Fs). The communication instrument 240 includes a communication I/F for performing wireless communication with the server 600 (FIG. 1) described later.

The battery 210 is configured to include a secondary battery such as a lithium ion battery or a nickel metal hydride battery. The secondary battery may be a battery assembly or an all-solid-state battery. Instead of the secondary battery, another power storage device such as an electric double layer capacitor may be adopted.

The vehicle 200 further includes a monitoring module 210a that monitors the state of the battery 210. The monitoring module 210a includes various sensors for detecting the state of the battery 210 (for example, voltage, current, and temperature), and outputs the detection result to the ECU 230. The monitoring module 210a may be a battery management system (BMS) having a state of charge (SOC) estimation function, a state of health (SOH) estimation function, a cell voltage equalization function, a diagnostic function, and a communication function, in addition to the above sensor function. The ECU 230 can acquire the state of the battery 210 (for example, temperature, current, voltage, SOC, and internal resistance) based on the output of the monitoring module 210a.

The vehicle 200 includes the MG 221 and the INV 222 for electric driving. The MG 221 is, for example, a three-phase AC motor generator. The MG 221 is driven by the INV 222 and is configured to rotate drive wheels W of the vehicle 200. The INV 222 drives the MG 221 using electric power supplied from the battery 210. Further, the MG 221 generates regenerative power and supplies the generated electric power to the battery 210 via the INV 222. The drive system of the vehicle 200 is not limited to the front wheel drive shown in FIGS. 1 and 2, and may be rear wheel drive or four-wheel drive.

The vehicle 200 includes the inlet 211 and the charger 212 for contact charging. The inlet 211 is configured such that the connector 311 of the power supply cable 312 of the charging stand 300 can be connected to the inlet 211. A contact is included in each of the inlet 211 and the connector 311. When the connector 311 is attached to the inlet 211, the contacts come into contact with each other, and the inlet 211 and the connector 311 are electrically connected. Hereinafter, the state in which the connector 311 is connected to the inlet 211 (that is, the state in which the charging stand 300 and the vehicle 200 are electrically connected via the power supply cable 312) is referred to as a "plug-in state". Further, the state in which the connector 311 is not connected to the inlet 211 (that is, the state in which the charging stand 300 and the vehicle 200 are not electrically connected) is referred to as a "plug-out state".

The charger 212 includes a power conversion circuit (not shown). The power conversion circuit converts electric power supplied to the inlet 211 from the outside of the vehicle into electric power suitable for charging the battery 210. For example, when AC power is supplied from the inlet 211, the charger 212 converts the supplied AC power into direct current (DC) power and supplies the converted power to the battery 210. The charger 212 is controlled by the ECU 230.

The server 600 included in the power supply system 1 shown in FIG. 1 includes a CPU 610, a memory 620, a storage device 630, and a communication unit 640. The CPU 610 is configured to execute predetermined information processing. The memory 620 is configured to store a program executed by the CPU 610 and data during execution of the program. The storage device 630 is configured to be able to store various types of information. The communication unit 640 includes various communication I/Fs. The CPU 610 is configured to communicate with the outside via the communication unit 640. The server 600 is configured to be capable of communicating with each charging stand 300. The server 600 may also be configured to communicate with the vehicle 200 via the charging stand 300 while the battery 210 is being charged.

A plurality of vehicles (including the vehicle 200), a plurality of users (including a user of the vehicle 200), and a plurality of sets of EVSE (including the charging stand 300) are registered in the server 600. The server 600 is configured to manage information on each registered user (hereinafter, also referred to as "user information"), information on each registered vehicle (hereinafter, also referred to as "vehicle information"), and information on each registered set of EVSE (hereinafter, also referred to as "EVSE information"). The information on a user terminal is included in at least one of the user information and the vehicle information. The user information, the vehicle information, and the EVSE information are stored in the storage device 630 of the server 600.

Identification information for identifying a user (user ID) is assigned to each user, and the server 600 manages the user information by distinguishing the user information by the user ID. The user ID also functions as information for identifying the user terminal (terminal ID). The user information includes, for example, communication address and location information of a mobile terminal carried by the user, and information for identifying a vehicle belonging to the user (vehicle ID). Further, identification information for identifying the vehicle (vehicle ID) is assigned to each vehicle, and the server 600 manages the vehicle information by distinguishing the vehicle information by the vehicle ID. The vehicle information includes, for example, vehicle specifications (for example, specifications related to charging), and information received by the server 600 from the user terminal (for example, vehicle traveling plan). Further, identification information for identifying the EVSE (EVSE-ID) is assigned to each set of EVSE, and the server 600 manages the EVSE information by distinguishing the EVSE information by the EVSE-ID. The EVSE information includes the connection state of the EVSE (plug-in state or plug-out state), the combination of the EVSE and the vehicle in the plug-in state (vehicle ID and EVSE-ID), and the power supply state of the EVSE (power supply being performed or power supply stopped).

The charging stands 300 having the configurations shown in FIGS. 1 and 2 may be set at multiple locations. The charging stands 300 may be configured such that the charging stands 300 are communicable with each other. The communication method may be wireless or wired. Hereinafter, layout examples of the charging stands 300 will be described with reference to FIGS. 3 and 4.

FIG. 3 is a diagram showing a first layout example of the charging stands 300. With reference to FIG. 3, in this example, multiple parking spaces 400 are partitioned by partition lines 402 so as to be arranged side by side (in a row) in the parking lot. A sidewalk 500 is provided along the lateral direction (direction orthogonal to the longitudinal direction) of the parking spaces 400. The sidewalk 500 is adjacent to each parking space 400. The charging stand 300 is installed at a position adjacent to each parking space 400 on the sidewalk 500. The charging stand 300 is provided for each parking space 400. The charging stands 300 are lined up along the sidewalk 500.

Figure 4:
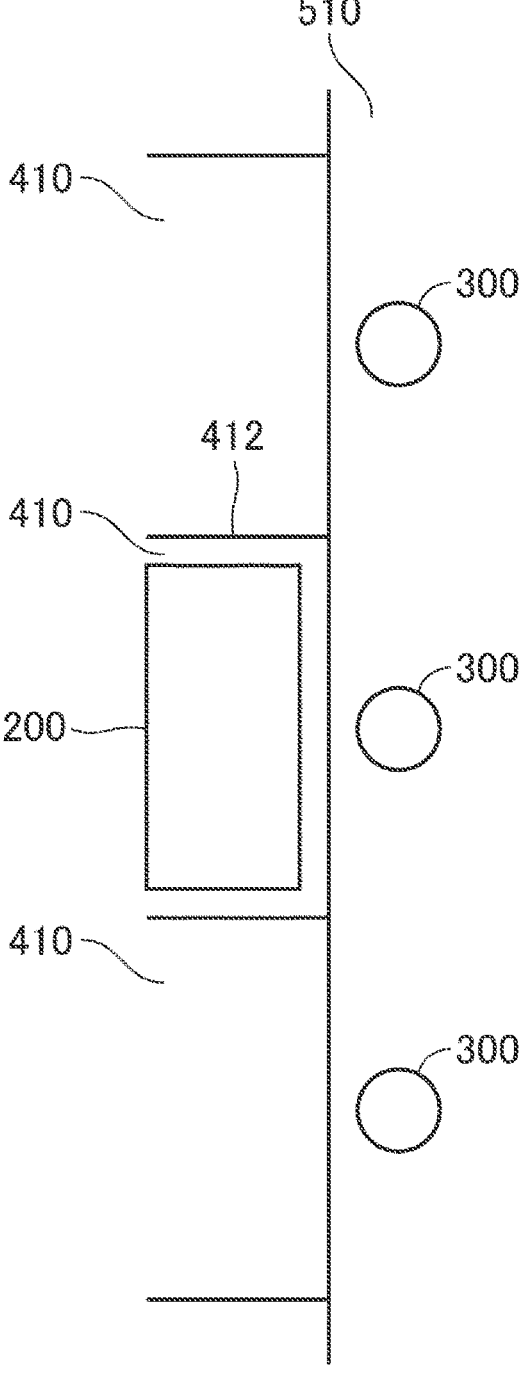
FIG. 4 is a diagram showing a second layout example of the charging stands.

FIG. 4 is a diagram showing a second layout example of the charging stands 300. With reference to FIG. 4, in this example, multiple parking spaces 410 are partitioned by partition lines 412 so as to be arranged tandem (parallel) in the parking lot. A sidewalk 510 is provided along the longitudinal direction of the parking spaces 410. The sidewalk 510 is adjacent to each parking space 410. The charging stand 300 is installed at a position adjacent to each parking space 410 on the sidewalk 510. The charging stand 300 is provided for each parking space 410. The charging stands 300 are lined up along the sidewalk 510.

An example of an operational flow in which the user of the vehicle 200 operates the charging stand 300 to charge the battery 210 will be described. When the charging stand 300 is not in use, the charging stand 300 is in the stored state (for example, the state shown in FIG. 1).

When the user parks the vehicle 200 in the parking space near the charging stand 300 and operates the touch panel display 250 of the vehicle 200 to start charging with the charging stand 300, the ECU 230 of the vehicle 200 transmits request information for starting charging to the server 600 via the communication instrument 240 and the communication unit 640 of the server 600. Upon receipt of the request information, the CPU 610 of the server 600 transmits control information for raising the movable portion 301 of the designated charging stand 300 to the charging stand 300 via the communication unit 640 and the communication unit 335 of the control device 330 of the charging stand 300.

Upon receipt of the control information, the processor 331 of the control device 330 of the charging stand 300 controls the actuator 320 so as to start raising of the movable portion 301. The movable portion 301 is raised to a position at which the connector 311 of the power supply cable 312 can be easily connected to the inlet 211 of the vehicle 200 (for example, the position Px shown in FIG. 2). With the above, the charging stand 300 is ready for plug-in. Hereinafter, the state in which the movable portion 301 is raised to a position at which the plug-in is possible is also referred to as a "raised state".

For example, with the charging stand 300 in the raised state as shown in FIG. 2, the user takes out the power supply cable 312 from the cable storage portion of the movable portion 301 and extends the power supply cable 312 toward the vehicle 200. Then, the user connects the connector 311 of the power supply cable 312 to the inlet 211 of the vehicle 200. With the above, the vehicle 200 and the charging stand 300 are brought into the plug-in state. In the plug-in state, communication between the vehicle 200 and the charging stand 300 becomes possible, and electric power can be exchanged between the vehicle 200 and the charging stand 300. The ECU 230 of the vehicle 200 communicates with the control device 330 of the charging stand 300 via the power supply cable 312.

The user operates the touch panel display 313 of the charging stand 300 in the plug-in state to cause the charging stand 300 to supply electric power. The charging stand 300 starts power supply in accordance with an instruction from the user. Specifically, in the charging stand 300, the power supply circuit 310 converts (for example, transforms) the AC power supplied from the AC power source 350 into AC power suitable for power supply to the vehicle 200, and supplies the converted power to the power supply cable 312. In the plug-in state, the electric power supplied from the power supply circuit 310 to the power supply cable 312 is input to the inlet 211 of the vehicle 200. Then, the battery 210 is charged in the vehicle 200. Specifically, the electric power input to the inlet 211 is supplied to the battery 210 via the charger 212. While the battery 210 is being charged, the control device 330 controls the power supply circuit 310 so as to adjust the electric power to be supplied, and the ECU 230 controls the charger 212 so as to adjust the electric power to be charged. As described above, the charging stand 300 is configured to charge the power storage device mounted on the vehicle.

After that, when charging of the battery 210 is completed, the user operates the touch panel display 313 of the charging stand 300 to instruct stop of power supply to the charging stand 300. When the battery 210 is fully charged, the ECU 230 automatically transmits stop instruction to the control device 330. The charging stand 300 stops power supply in accordance with the stop instruction. Then, the user pulls out the connector 311 of the power supply cable 312 from the inlet 211 of the vehicle 200, and stores the power supply cable 312 in the cable storage portion. With the above, the vehicle 200 and the charging stand 300 are brought into the plug-out state. When the user returns the power supply cable 312 to the cable storage portion and operates the touch panel display 313 to lower the movable portion 301, the control device 330 lowers the movable portion 301 to the lower limit position P1 of the movable range R2. When the position of the movable portion 301 reaches the lower limit position P1, the ground F1 and the top surface 301a of the movable portion 301 become flush with each other. Thus, the charging stand 300 is brought into the stored state again.

The charging stand 300 as described above can be stored under the ground. Therefore, there is a possibility of being submerged in the event of heavy rain such as sudden downpour.

Therefore, the charging stand 300 includes electrical components for supplying electric power to the vehicle 200 on the ground (for example, the control device 330, the power supply circuit 310, the actuator 320, the connector 311, the touch panel display 313, the communication device 341, the notification device 342, and the cable reel device 353) and the buoyancy generation portion 390 that causes a specific component that is at least a part of the electrical components and for which submersion is avoided to float above the ground by buoyancy when water is accumulated in the recess R1 under the ground in which the charging stand 300 is stored. The specific component is an electrical component that does not have a waterproof structure and is likely to break down when submerged. The electrical component of which terminal portion for connecting to another electrical component does not have a waterproof structure even when the electrical component itself has a waterproof structure is included in the specific component.

With the above, when water is accumulated in the recess R1, the specific component of the electrical components for which submersion is avoided can be floated above the ground by buoyancy. As a result, it is possible to suppress the electrical components from being submerged.

With reference to FIGS. 1 and 2 again, a sewage pipe 316 for draining sewage such as rainwater to a sewage treatment facility or a river is provided in the ground below the bottom surface of the recess R1. A drainage pipe 318 is connected to the sewage pipe 316 from the bottom surface of the recess R1. The drainage pipe 318 allows water such as rainwater accumulated in the recess R1 to be drained to the sewage pipe 316.

Figure 5:
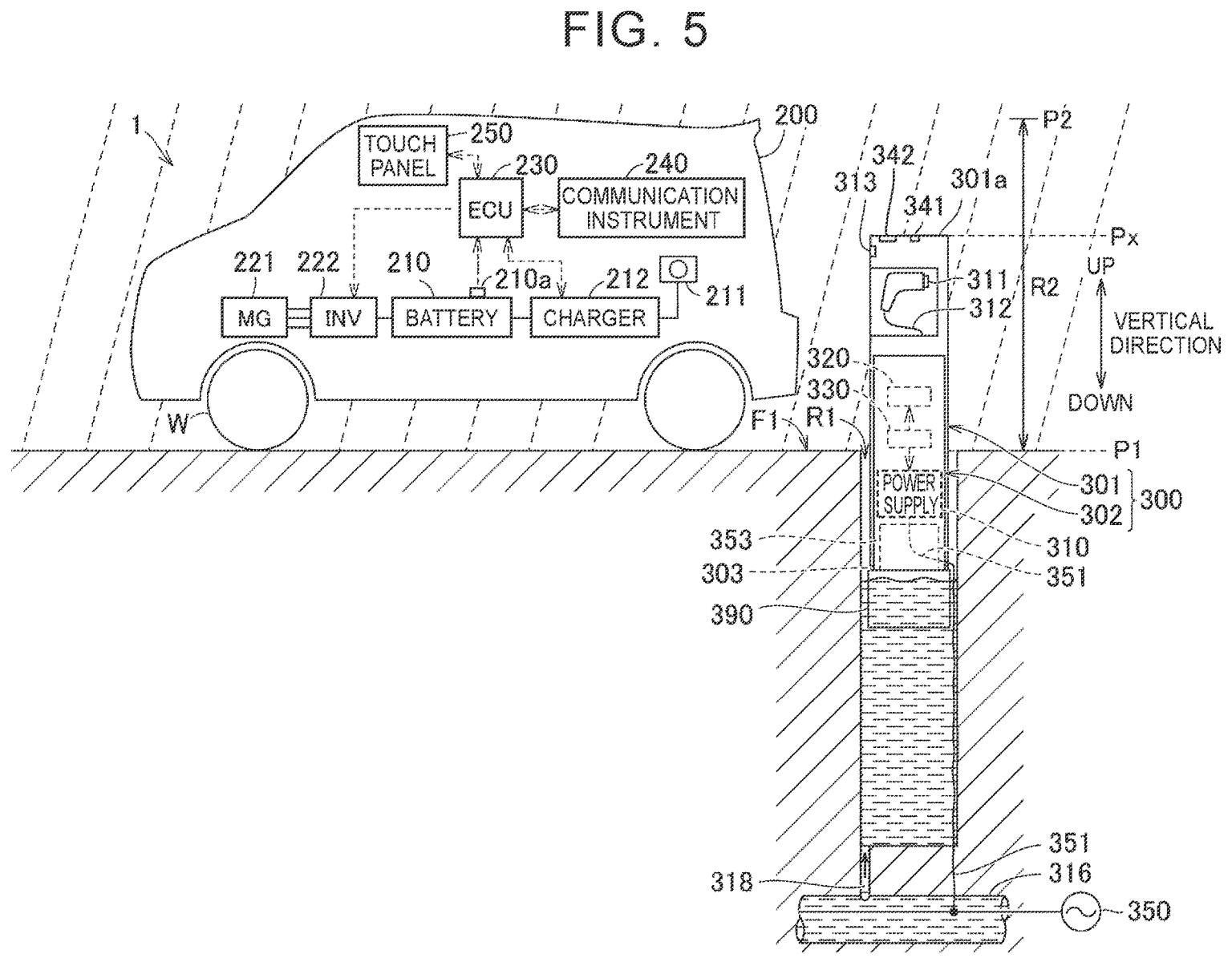

FIG. 5 is a diagram showing a state of the charging stand 300 when the recess R1 is submerged. With reference to FIG. 5, when the amount of sewage exceeds the drainage capacity of the sewage pipe 316 due to rainfall or the like, the sewage flows back through the drainage pipe 318 and infiltrates into the recess R1. In addition, rainwater also infiltrates from above the recess R1.

The buoyancy generation portion 390 generates buoyancy when the recess R1 is submerged, and floats the movable portion 301 and the fixed portion 302. Note that, the buoyancy generation portion 390 has a volume and a specific gravity capable of generating buoyancy exceeding the gravity due to the mass of the charging stand 300. The power cable 351 is unreeled from the cable reel device 353 inside the fixed portion 302 of the charging stand 300. Therefore, floating of the movable portion 301 and the fixed portion 302 is not hindered by being pulled by the power cable 351. With the above, the electrical components inside the movable portion 301 and the fixed portion 302 (for example, the control device 330, the power supply circuit 310, the actuator 320, the connector 311, the touch panel display 313, the communication device 341, the notification device 342, and the cable reel device 353) can be suppressed from being submerged.

Second Embodiment

In the first embodiment, as shown in FIG. 5, when the recess R1 is submerged, the movable portion 301 and the fixed portion 302 are floated by the buoyancy generated by the buoyancy generation portion 390. In a second embodiment, a fixed portion 302A is not floated and a movable portion 301A is floated.

Figure 6:
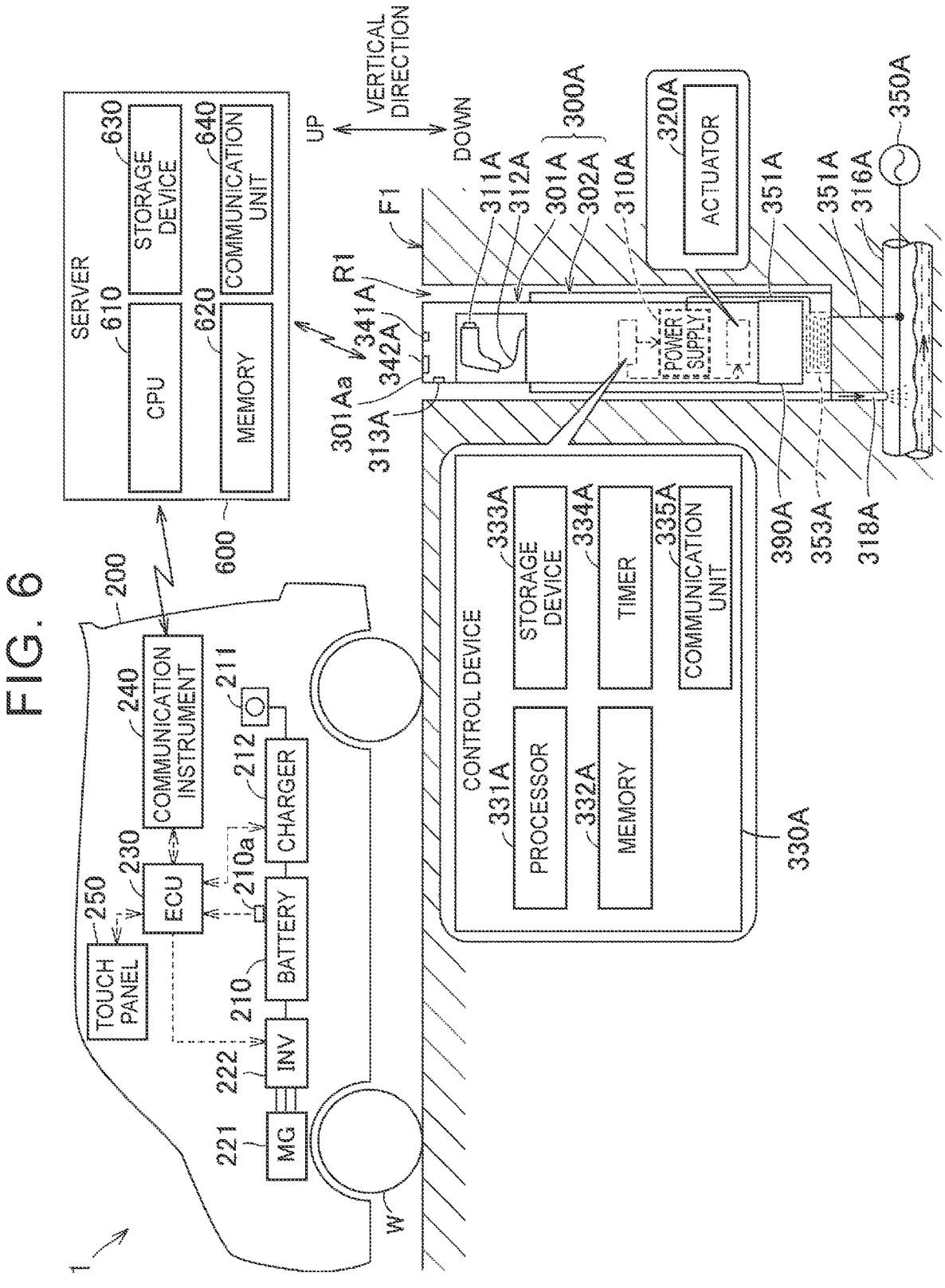
FIG. 6 is a diagram showing configurations of a vehicle and power supply equipment according to a second embodiment.
Figure 7:
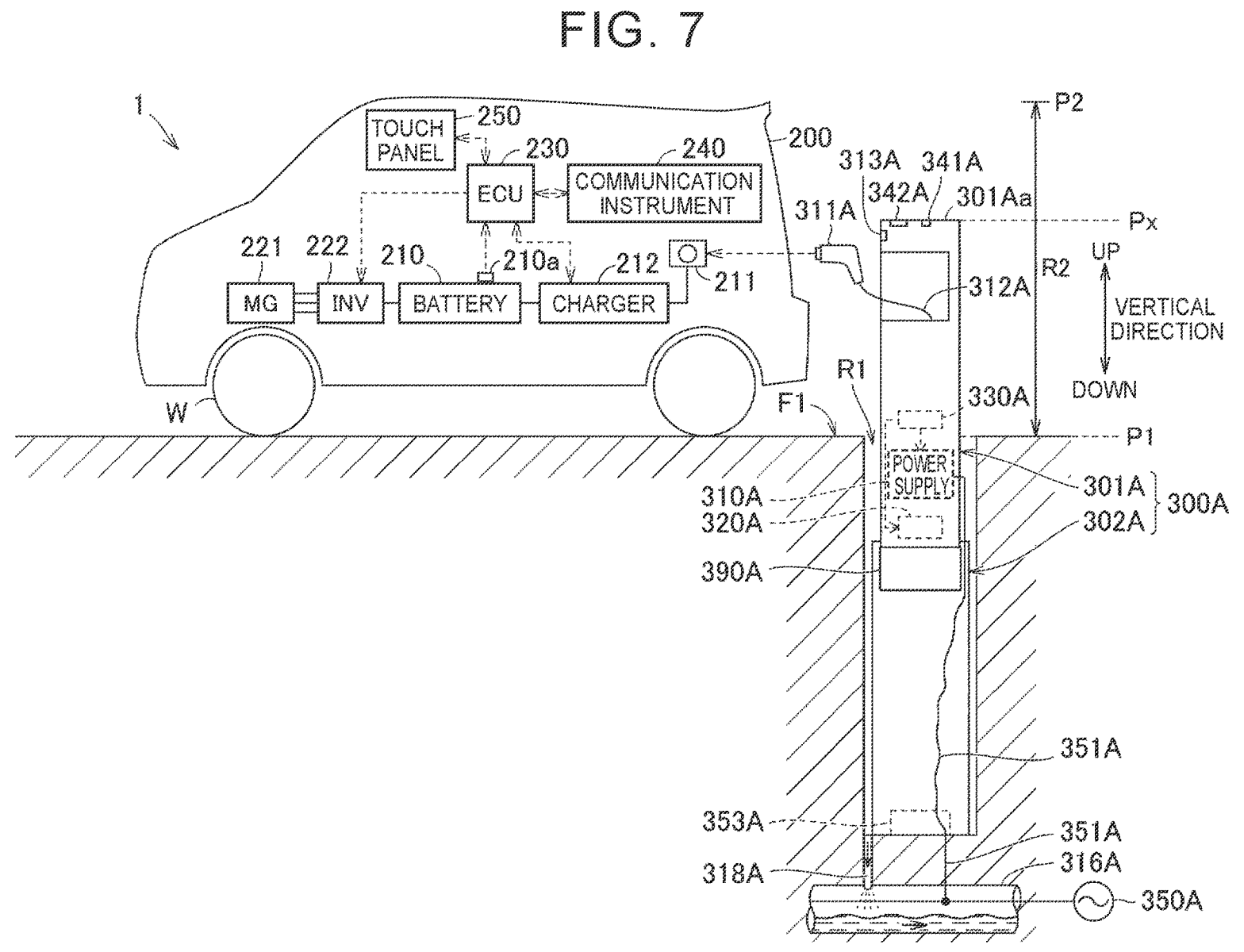
Figure 8:
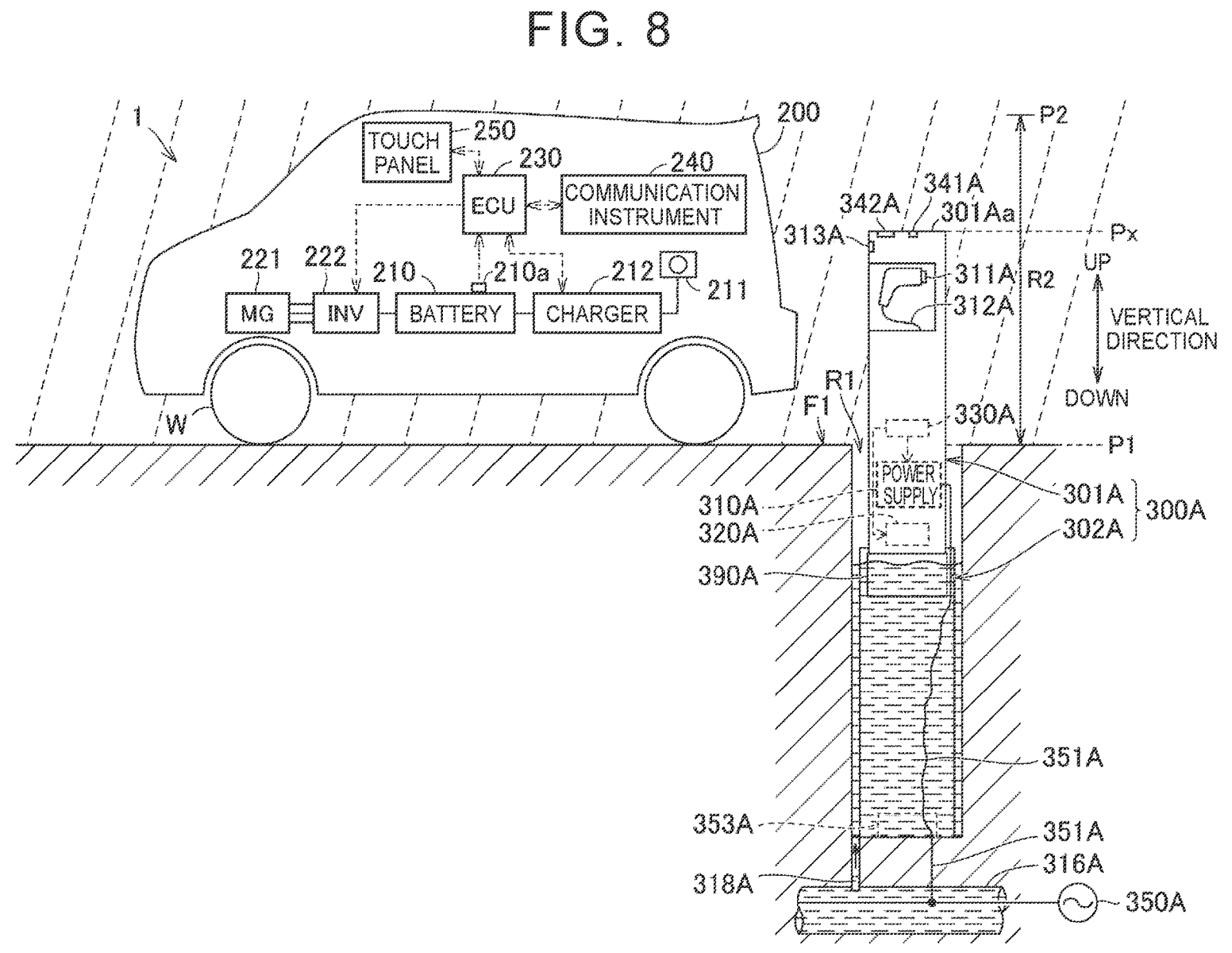

FIG. 6 is a diagram showing configurations of the vehicle 200 and power supply equipment according to the second embodiment. FIG. 7 is a diagram showing a state in which the movable portion 301A according to the second embodiment is raised. FIG. 8 is a diagram showing a state of a charging stand 300A when the recess R1 according to the second embodiment is submerged. FIGS. 6 to 8 of the second embodiment correspond to FIGS. 1, 2 and 5, respectively, of the first embodiment. In FIGS. 6 to 8, the portion different from FIGS. 1, 2 and 5 is the structure of the charging stand 300A. The functions of the respective portions of the charging stand 300A according to the second embodiment are the same as the functions of the respective portions of the charging stand 300 according to the first embodiment. Therefore, the duplicate description will not be repeated.

In the first embodiment, the control device 330, the power supply circuit 310, and the actuator 320 are provided in the fixed portion 302. With reference to FIGS. 6 to 8, in the second embodiment, a control device 330A, a power supply circuit 310A, and an actuator 320A are provided in the movable portion 301A. A buoyancy generation portion 390A is arranged so as to be connected to the lower end of the movable portion 301A. A cable reel device 353A is provided in the fixed portion 302A. The fixed portion 302A is configured to allow water to enter. Therefore, in the cable reel device 353A, the terminal portion of a power cable 351A is waterproof As shown in FIG. 7, when the movable portion 301A is raised by the operation of the actuator 320A, the power cable 351A is unreeled from the cable reel device 353A. Therefore, raising of the movable portion 301A is not hindered by being pulled by the power cable 351A.

With reference to FIG. 8, when the amount of sewage exceeds the drainage capacity of a sewage pipe 316A due to rainfall or the like, the sewage flows back through a drainage pipe 318A and infiltrates into the recess R1. In addition, rainwater also infiltrates from above the recess R1.

The buoyancy generation portion 390A generates buoyancy when the recess R1 is submerged, and floats the movable portion 301A. The buoyancy generation portion 390A has a volume and a specific gravity capable of generating buoyancy exceeding the gravity due to the mass including the electrical components inside the movable portion 301A of the charging stand 300A. The power cable 351A is unreeled from the cable reel device 353A inside the fixed portion 302A of the charging stand 300A. Therefore, floating of the movable portion 301A is not hindered by being pulled by the power cable 351A. With the above, the electrical components inside the movable portion 301A (for example, the control device 330A, the power supply circuit 310A, the actuator 320A, the connector 311A, the touch panel display 313A, the communication device 341A, and the notification device 342A) can be suppressed from being submerged.

Modification (1) In the above-described embodiments, as shown in FIGS. 1 and 2, the movable portions 301, 301A of the charging stands 300, 300A are raised and lowered by the actuators 320, 320A. However, the present disclosure is not limited to this, and the movable portions 301, 301A may be configured so as to be manually raised and lowered by the user.

(2) In the above-described embodiments, as shown in FIGS. 1 and 2, and FIGS. 6 and 7, the charging stands 300, 300A are configured to be divided into the movable portions 301, 301A and the fixed portions 302, 302A. However, the present disclosure is not limited to this, and the charging stand may be configured of the movable portion only without including the fixed portion.

(3) In the above-described embodiments, as shown in FIG. 2, the buoyancy generation portions 390, 390A each include a hollow and sealed box. However, the present disclosure is not limited to this. The buoyancy generation portions 390, 390A only need to include an object having a smaller specific gravity than that of water (for example, an object having a specific gravity of one-tenth ($\frac{1}{10}$) or less of that of water). For example, the buoyancy generation portions 390, 390A may include a hollow and sealed bag, or a block made of a substance (e.g., foamed styrene) of which specific gravity is considerably lower than that of water.

(4) In the above-described embodiments, the electric power supplied to the vehicle 200 by the power supply equipment such as the charging stands 300, 300A may be AC power or DC power.

(5) In the above-described embodiments, the power supply target of the power supply equipment such as the charging stands 300, 300A is an electrified vehicle such as the vehicle 200. However, the power supply target of the power supply equipment is not limited to this, and may be a transportation system or other device such as a drone or a mobile robot provided with the battery 210 and requiring power supply, or may be a plug-in hybrid electric vehicle (PHEV).

(6) The above-described embodiments can be regarded as the disclosure of the power supply system 1, and can be regarded as the disclosure of the power supply equipment such as the charging stands 300, 300A, the server 600, or the vehicle 200.

Summary (1) As shown in FIGS. 1 to 8, each of the charging stands 300, 300A is power supply equipment that can be stored in the storage portion under the ground, and includes electric components for supplying electric power to the vehicle 200 on the ground (for example, the control devices 330, 330A, the power supply circuits 310, 310A, the actuators 320, 320A, the connectors 311, 311A, the touch panel displays 313, 313A, the communication devices 341, 341A, the notification devices 342, 342A, and the cable reel devices 353, 353A), and the buoyancy generation portions 390, 390A that float the specific components that are at least part of the electrical components and for which submersion is avoided (for example, the control devices 330, 330A, the power supply circuits 310, 310A, the actuators 320, 320A, the connectors 311, 311A, the touch panel displays 313, 313A, the communication devices 341, 341A, the notification devices 342, 342A, and the cable reel device 353) above the ground when water is accumulated in the recess R1. The specific component is an electrical component that does not have a waterproof structure and is likely to break down when submerged. The electrical component of which terminal portion for connecting to another electrical component does not have a waterproof structure even when the electrical component itself has a waterproof structure is included in the specific component.

With the above, when water is accumulated in the recess R1, the specific component of the electrical components for which submersion is avoided can be floated above the ground by buoyancy. As a result, it is possible to suppress the electrical components from being submerged.

(2) As shown in FIGS. 1 to 8, the charging stands 300, 300A may further include a housing including built-in electrical components. The electric components may include a power supply port for supplying electric power to the vehicle 200 on the ground (for example, the electrical components may include the connectors 311, 311A connected to the vehicle 200, or connection ports on the movable portions 301, 301A sides to which the power supply cables 312, 312A are connected). The housing may include the fixed portions 302, 302A fixed to the bottom surface of the recess R1 (the fixed portion 302 is fixed to the bottom surface of the recess R1 via the buoyancy generation portion 390) and the movable portions 301, 301A that include built-in specific components and are displaceable between the position at which the power supply port is stored under the ground and the position at which the power supply port is exposed on the ground. The charging stands 300, 300A may further include the actuators 320, 320A that raise and lower the movable portions 301, 301A.

With the above, when the specific components are not submerged, the power supply port for supplying electric power to the vehicle 200 on the ground can be exposed on the ground by raising the movable portions 301, 301A.

(3) As shown in FIGS. 6 to 8, the buoyancy generation portion 390A may cause the movable portion 301A to float above the ground.

With the above, it is possible to suppress the specific component built in the movable portion 301A, among the electrical components, from being submerged.

(4) As shown in FIGS. 1, 2 and 5, the buoyancy generation portion 390 may cause the movable portion 301 and the fixed portion 302 to float above the ground.

With the above, it is possible to suppress the electrical components other than the specific component built in the fixed portion 302, in addition to the specific component built in the movable portion 301 among the electrical components, from being submerged.

(5) As shown in FIGS. 1 and 2 and FIGS. 6 and 7, the buoyancy generation portions 390, 390A may each include a hollow and sealed box.

With the above, the specific component can float above the ground by the buoyancy of the hollow and sealed box.

(6) As shown in the modification, the buoyancy generation portions 390, 390A may each include a block made of a substance having a smaller specific gravity than that of water.

With the above, the specific component can float above the ground by the buoyancy of the block made of a substance having a smaller specific gravity than that of water.

In addition, the above-mentioned embodiments may be carried out by appropriately combining all or a part thereof. The embodiments disclosed herein should be considered to be exemplary and not restrictive in all respects. The scope of the present disclosure is shown by the scope of claims rather than the descriptions above, and is intended to include all modifications within the meaning and the scope equivalent to the scope of claims.

What is claimed is:

1. Power supply equipment that is storable in a storage portion under a ground, the power supply equipment comprising:

an electrical component including a power supply port for supplying electric power to a vehicle on the ground;

a buoyancy generation portion that floats a specific component that is at least a part of the electrical component and for which submersion is avoided above the ground when water is accumulated in the storage portion;

a housing that includes the power supply port built in the housing, the housing including:

a fixed housing disposed above the buoyancy generation portion and fixed to a top surface of the buoyancy generation portion, and a movable housing that includes the specific component built in the movable housing and that is displaceable between a position at which the power supply port is housed under the ground and a position at which the power supply port is exposed on the ground; and an electric actuator that raises and lowers the movable housing, wherein the fixed housing and the buoyancy generation portion have a cylindrical shape, wherein the movable housing has a larger diameter than that of the fixed housing, and the movable housing is disposed outside the fixed housing such that central axes of the movable housing and the fixed housing coincide with each other, and wherein the movable housing is displaceable in a vertical direction along an outer peripheral surface of the fixed housing.

2. The power supply equipment according to claim 1, wherein the buoyancy generation portion floats the movable housing above the ground.

3. The power supply equipment according to claim 1, wherein the buoyancy generation portion floats the movable housing and the fixed housing above the ground.

4. The power supply equipment according to claim 1, wherein the buoyancy generation portion includes a hollow and sealed box.

5. The power supply equipment according to claim 1, wherein the buoyancy generation portion includes a block made of a substance having a lower specific gravity than a specific gravity of water.

6. The power supply equipment according to claim 1, wherein the buoyancy generation portion is a block made of foamed styrene.

7. The power supply equipment according to claim 1, wherein the electrical component further includes a power cable, and wherein the fixed housing includes a cable reel device configured to unreel the power cable.

8. The power supply equipment according to claim 1, wherein the buoyancy generation portion includes a housing that is hollow and sealed.

9. The power supply equipment according to claim 8, wherein the movable housing has the cylindrical shape corresponding to the shape of the fixed housing such that the movable housing and the fixed housing form a column shape, and wherein the electric actuator raises and lowers the movable housing with respect to the fixed housing.

* * * * *